United States Patent
Airey

(12) 
(10) Patent No.: US 9,416,641 B2
(45) Date of Patent: Aug. 16, 2016

(54) BOREHOLE MICROSEISMIC SYSTEMS AND METHODS

(71) Applicant: Schlumberger Technology Corporation, Sugar Land, TX (US)

(72) Inventor: Peter Airey, Saint Germain Laval (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 657 days.

(21) Appl. No.: 13/668,314

(22) Filed: Nov. 4, 2012

(65) Prior Publication Data

US 2014/0123748 A1    May 8, 2014

(51) Int. Cl.
*E21B 43/26* (2006.01)
*G01V 1/42* (2006.01)

(52) U.S. Cl.
CPC . *E21B 43/26* (2013.01); *G01V 1/42* (2013.01); *G01V 2210/123* (2013.01)

(58) Field of Classification Search
CPC ..... G01V 1/42; G01V 2210/123; G01V 1/40; E21B 43/26
See application file for complete search history.

(56) References Cited

U.S. PATENT DOCUMENTS

| | | | |
|---|---|---|---|
| 8,009,059 B2* | 8/2011 | Huang et al. | 340/853.3 |
| 8,041,510 B2* | 10/2011 | Dasgupta | 702/12 |
| 2006/0023567 A1* | 2/2006 | Uhl et al. | 367/13 |
| 2007/0194947 A1* | 8/2007 | Huang et al. | 340/854.3 |
| 2007/0219728 A1* | 9/2007 | Papageorgiou et al. | 702/23 |
| 2007/0255545 A1* | 11/2007 | Pita et al. | 703/10 |
| 2008/0109175 A1* | 5/2008 | Michalak | 702/50 |
| 2008/0262737 A1* | 10/2008 | Thigpen | E21B 43/00 702/9 |
| 2009/0299637 A1* | 12/2009 | Dasgupta | 702/12 |
| 2011/0141846 A1* | 6/2011 | Uhl et al. | 367/35 |
| 2011/0188348 A1* | 8/2011 | Auzerais | G01V 1/40 367/86 |
| 2012/0123684 A1* | 5/2012 | Vu et al. | 702/14 |
| 2012/0273192 A1* | 11/2012 | Schmidt | E21B 47/122 166/250.1 |
| 2013/0087325 A1* | 4/2013 | Bartko | E21B 41/0035 166/250.1 |
| 2013/0194892 A1* | 8/2013 | Golparian et al. | 367/25 |
| 2013/0301389 A1* | 11/2013 | Alford et al. | 367/81 |
| 2014/0365134 A1* | 12/2014 | Eisner et al. | 702/14 |

* cited by examiner

*Primary Examiner* — John Fitzgerald
(74) *Attorney, Agent, or Firm* — Jody Lynn DeStefanis; Daryl R. Wright

(57) ABSTRACT

Devices and methods for borehole seismic investigation. The devices can include a first sensor for acquiring data relating to a microseismic event, a second sensor for detecting the start of a microseismic event and a command module for activating the first sensor to transmit data when the second sensor detects the start of the microseismic event. The methods can include activating a first sensor to transmit data relating to a microseismic event when a second sensor detects the start of the microseismic event. The method can also include deactivating the first sensor, or stopping data transmission substantially when the microseismic event ends.

20 Claims, 3 Drawing Sheets

BOREHOLE MICROSEISMIC SYSTEMS AND METHODS

FIELD

The present disclosure relates to the study of underground formations and structures, for example as it relates to oil and gas exploration. The present disclosure relates more specifically to borehole microseismic systems and methods.

BACKGROUND

Borehole seismic investigation is among the tools that oil and gas professionals use to assist them in understanding formation properties. Seismic investigation typically involves generating acoustic waves that travel downwardly into the formation by firing a source placed at the surface of the formation. The acoustic waves are reflected back upwardly toward the surface by subterranean layers of rock. Receivers may be positioned in the borehole to record data relating to the reflected waves, which data geophysicists may use in an attempt to gain a picture of the subterranean structure of the formation.

Borehole seismic investigation has been adapted to monitor microseismic events, including natural and artificially triggered events such as when fluid is produced from or injected into a naturally fractured reservoir. Because the timing of microseismic events cannot be predicted, recording systems are typically active for extended periods of time. For example, when monitoring microseismic events during a hydraulic fracturing job, the total pumping time in which fracturing may occur can last several hours. During this time, a few tens of microseismic events, which have a duration on the order of seconds, may be recorded. Consequently, in a typical project, about 99% of the data transmitted to surface contains nothing of interest. The large volume of data generated by an array of microseismic acoustic sensors in a well requires a sophisticated telemetry system. Even so, telemetry may still be the bottleneck for real-time data acquisition. Downhole data filtering may allow transmission of only the pertinent data and may remove the data rate constraint of the telemetry system. Typical downhole filtering/data compression systems, however, are based on analysis of the acquired data in order to identify an event of interest and event identification is normally performed by an experienced analyst and can be very difficult to automate.

SUMMARY

The disclosure relates to systems and methods for reducing the volume of data transmitted during microseismic borehole surveys.

In some embodiments, the systems include a first sensor (which may be a single sensor or an array of sensors, such as a microseismic array of sensors) for acquiring and transmitting data associated with acoustic signals; a second sensor for detecting a property associated with a microseismic event; and a command module configured for instructing the first sensor to transmit acquired data when the second sensor detects the property.

In some embodiments, the command module is configured for instructing the first sensor to transmit a portion of acquired data, which portion may correspond to data acquired shortly (e.g. about ten seconds or less) before the second sensor detects the property through data acquired shortly (e.g. up to about ten seconds, up to about twenty seconds, up to about thirty seconds, up to about one minute, up to about two minutes, up to about three minutes, up to about four minutes, or even up to about five minutes) after the second sensor detects the property. In some embodiments, the command module is configured to instruct the first sensor to transmit data corresponding to a pre-determined period of time, for example a time period equal to an average duration of a microseismic event, for example for a period of time ranging from about twenty seconds to about five minutes, or for a period of time equal to the longest expected duration of a microseismic event. In further embodiments, the command module is configured to instruct the first sensor to transmit data corresponding to a pre-determined period of time, such as for example from about twenty seconds to about five minutes (or for example any of the other previously mentioned possibilities), and the transmitted data includes data acquired prior to the second sensor detecting the property, for example the transmitted data includes data collected shortly before the second sensor detects the property, for example the transmitted data includes data collected during a time period of ten seconds or less before the second sensor detects the property.

In some embodiments, the systems further include a surface data acquisition system for receiving data transmitted by the first sensor.

In some embodiments, the second sensor is a high frequency pressure gauge, and the property it detects is a rapid negative pressure transient induced as a fracture opens.

In some embodiments, the first sensor and the second sensor are located in the same borehole, the data acquisition system is on the surface, and the command module is either in the borehole with the sensors or on the surface. In some embodiments, the first sensor and the second sensor are located in different boreholes, and the data acquisition system and the command module are located on the surface. In some embodiments, the command module is part of the surface data acquisition system.

In some embodiments, the methods involve using a first sensor to acquire acoustic data, activating the first sensor to transmit data, for example relating to a microseismic event, substantially when a second sensor identifies an occurrence of the microseismic event. In some embodiments, the methods further involve deactivating the first sensor from transmitting data substantially when the microseismic event ends. In some embodiments, the transmitted data includes data acquired by the first sensor shortly before (for example about ten seconds or less) the second sensor identifies the occurrence. In some embodiments, the transmitted data ranges from data acquired by the first sensor shortly before (for example about ten seconds or less) the second sensor identifies the occurrence to data acquired by the first sensor shortly after (for example up to about ten seconds, up to about twenty seconds, up to about thirty seconds, up to about one minute, up to about two minutes, up to about three minutes, up to about four minutes, or even up to about five minutes) the second sensor identifies the occurrence.

In some embodiments, the methods further involve the first sensor, once activated, transmitting data for a pre-determined period of time, for example for a time period equal to the average duration of a microseismic event, or for a time period ranging from a few seconds to a few minutes, for example for a time period ranging from about twenty seconds to about five minutes.

In some embodiments, detecting the occurrence of the microseismic event includes detecting a rapid negative pressure transient induced as a fracture opens.

In some embodiments, the methods further involve deploying the first sensor in a first borehole; deploying the second sensor in a second borehole, where the first borehole and the second borehole can be the same borehole; deploying a surface data acquisition system to which the first sensor transmits the data; and deploying a command module on surface when the first borehole and the second borehole are separate boreholes or deploying the command module either on surface or in the first borehole when the first borehole and the second borehole are the same borehole.

The identified embodiments are exemplary only and are therefore non-limiting. The details of one or more non-limiting embodiments of the present disclosure are set forth in the accompanying drawings and the descriptions below. Other embodiments should be apparent to those of ordinary skill in the art after consideration of the present disclosure.

BRIEF DESCRIPTION OF THE DRAWINGS

Certain embodiments of the present disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
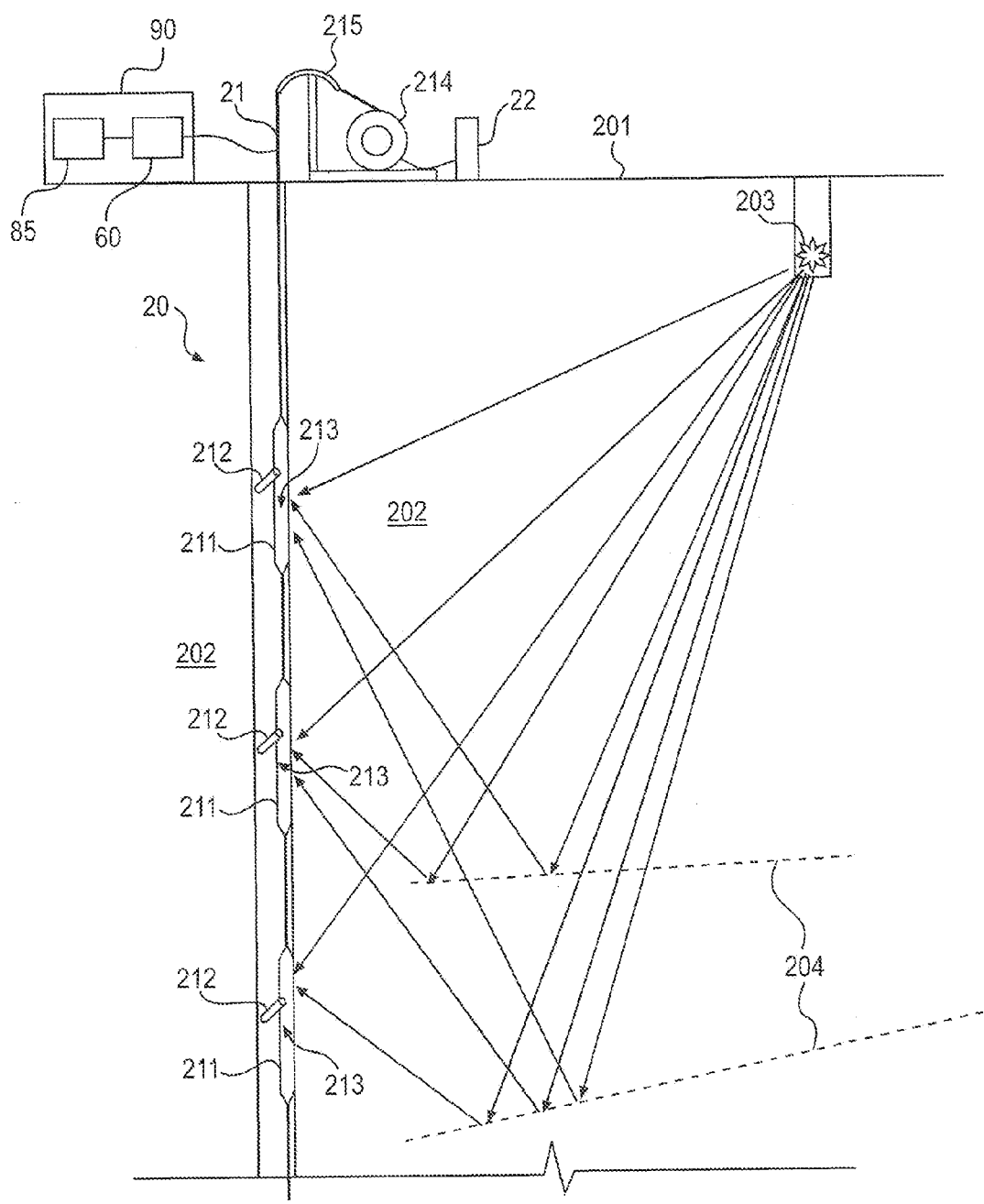
FIG. 1 is a schematic illustration of a vertical seismic profiling ("VSP") operation suitable for use with embodiments of devices and methods of this disclosure.

Illustrative embodiments and aspects are described below. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that don't negatively impact the intended purpose or deviations from the descriptive term taking into account inherent technological limitations. For example, in some embodiments, the statement "activating the transmission of data relating to a microseismic event substantially when the microseismic event is detected" is intended to account for technical limitations resulting in delays between when the microseismic event is detected and when the instruction to transmit data is received and transmission of data begins. Descriptive terms are implicitly understood to be modified by the word substantially, even if the term is not explicitly modified by the word substantially.

The term "sensor" encompasses both a single sensor or a sensor array unless explicitly stated otherwise or nonsensical in context.

The terms "wellbore" and "borehole" are used interchangeably.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning. That is, both terms are understood as related to the collection of downhole information generally, to include, for example, both the collection of information relating to the movement and position of the drilling assembly and the collection of formation parameters.

An example vertical seismic acquisition in a borehole is illustrated in FIG. 1. A cable 21 carrying a plurality of VSP shuttles 211 is suspended from the surface 201 of a borehole 20 into the borehole 20. System noise is alleviated or avoided by pushing or wedging the shuttles against the formation 202 or any casing surrounding the wellbore 20 using any suitable means, including inflatable bellows, or as shown, a clamping or locking mechanism 212.

The clamping or locking mechanism 212 can be based on the use of springs, telescopic rams or pivoting arms as shown. The shuttles 211 can carry transducer elements 213 to measure the velocity or acceleration in one of three independent directions. The clamping mechanism 212 couples the transducers 213 to the borehole wall.

On the surface, a cable reel 214 and feed 215 supports the cable 21. Measurement signals or data are transmitted through the cable 21 to a base station 22 on the surface for further processing. The cable 21 may be an armored cable used for wireline operations.

In operation, a source 203, as shown, is activated generating seismic waves which travel through the formation 202. Where there are changes in formation impedance (as indicated by dashed lines 204), part of the seismic energy may be reflected and/or refracted. In embodiments according to the present disclosure, which involve microseismic event localization, the source may be the microseismic event itself rather than the illustrated controlled source 203. In any event, transducers 213 register movements of the earth and the measurements are transmitted directly or after in-line digitization and/or signal processing to the surface base station 22 for storage, transmission and/or further processing.

The well-site system is also shown to include an electronics subsystem (also referred to as 'command module' 90), which may include a controller 60 and a processor 85, and which may optionally be the same processor used for analyzing tool data and which together with the controller 60 can serve multiple functions. The controller and processor need not be on the surface as shown. For example, in some embodiments, alternatively or in addition, the controller and/or processor may be located downhole.

The above-described configuration can be adapted for use in passive seismic monitoring for recording microseismic signals generated when fluid is produced from, or injected into, a reservoir. Similarly, the borehole seismic methods can be adapted for use in monitoring hydraulically-induced fractures. In either case, the above-described system may remain the same except the sensors record data associated with acoustic signals generated by a microseismic event rather than by a controlled source. Further, because the timing of microseismic events cannot be predicted, contrary to typical VSP monitoring systems, microseismic acquisition (e.g. recording and transmitting) systems are active for long periods of time while waiting to receive acoustic emissions. Embodiments according to the present disclosure, as discussed in more detail below, reduce the receiver's active period in which it transmits data to a surface data acquisition system.

The present disclosure modifies conventional microseismic investigation systems and methods. For example, in some embodiments, microseismic investigation systems according to the present disclosure include: a first sensor (which can be an array of sensors); a second sensor (or an array of sensors); and a command module 90, which may include a controller 60 and/or a processor 85 such as shown in FIG. 1. The first sensor acquires data relating to acoustic signals. The second sensor detects an event, for example a property associated with the occurrence of an event, such as a property associated with a microseismic event. And the command module links the two sensors such that the first sensor is activated to transmit data substantially when the second sensor detects the event.

In some embodiments, the methods include instructing a first sensor used for acquiring data relating to acoustic signals generated by a microseismic event to transmit the data corresponding to the microseismic event. In general, in some embodiments, any set of instructions resulting in the first sensor transmitting data substantially corresponding to a portion or all of the data acquired relating to the microseismic event are within scope of this disclosure. For example, in some embodiments, the methods include instructing the first sensor to transmit data acquired shortly before, during and/or shortly after the second sensor identifies an occurrence of a microseismic event, or the methods may include instructions for transmitting data for a time period substantially equal to the duration of a microseismic event, or for a pre-determined time period such as from a few seconds to a few minutes (such as for example from about twenty seconds up to about five minutes). In further embodiments, the transmitted data includes data acquired prior to the second sensor detecting the event, for example shortly before the second sensor detects the event, for example up to about ten seconds before the second sensor detects the event regardless of the duration of data transmission.

Figure 2:
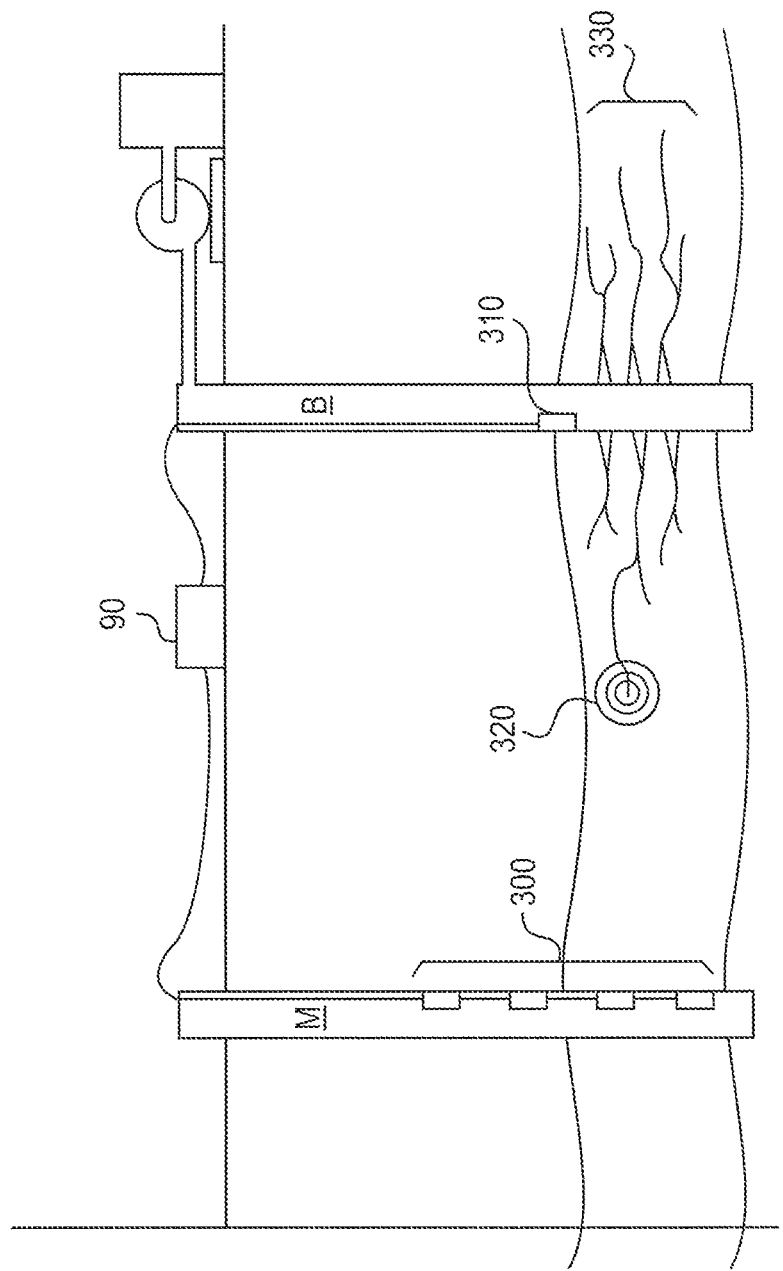
FIG. 2 is a schematic illustration of a hydraulic fracture system including an embodiment of a borehole microseismic system in accordance with this disclosure.
Figure 3:
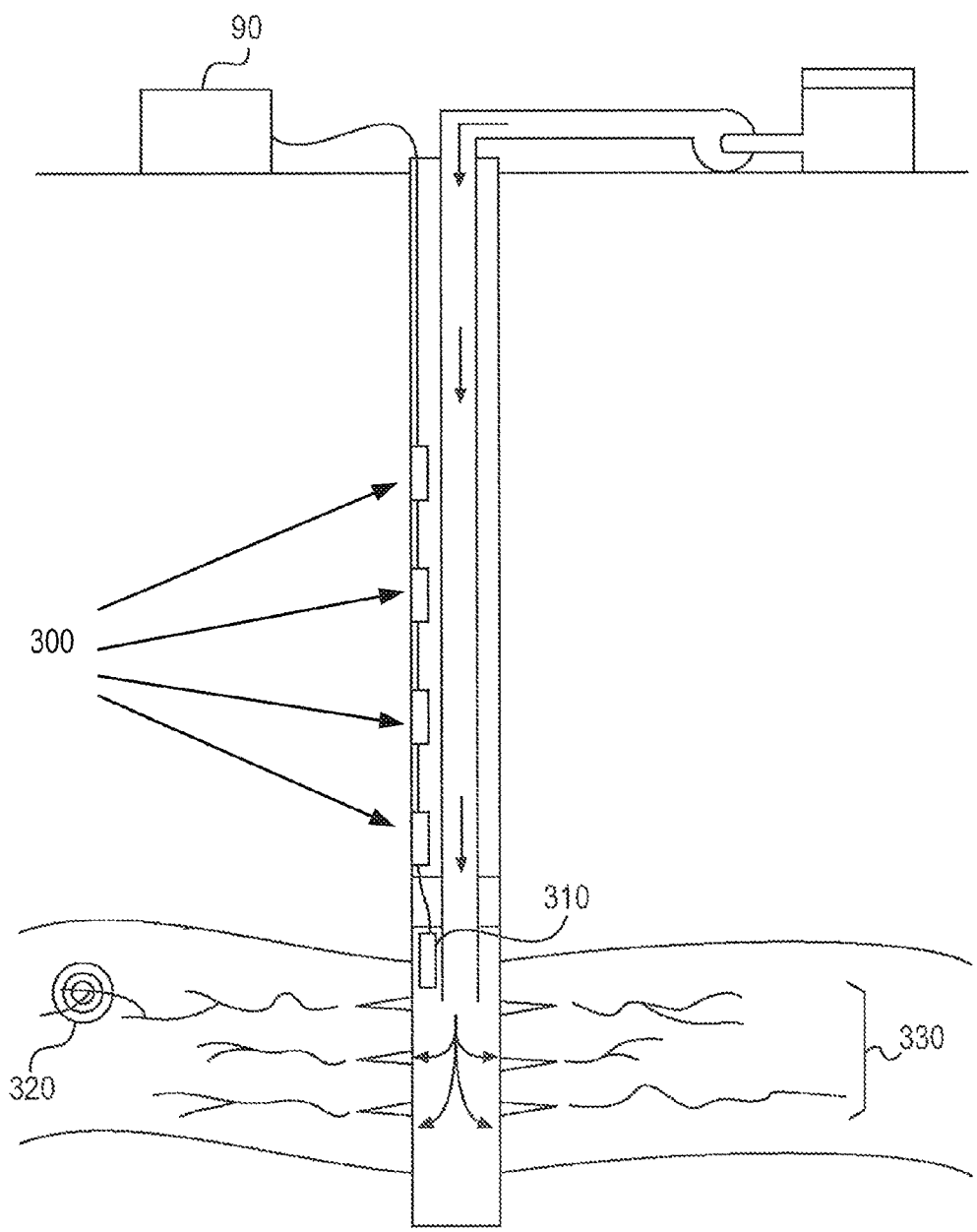
FIG. 3 is a schematic illustration of another hydraulic fracture system including another embodiment of a borehole microseismic system in accordance with this disclosure.

FIGS. 2 and 3 are schematic illustrations of fracturing operations implementing embodiments of borehole seismic systems according to this disclosure. As shown in FIGS. 2 and 3, in some embodiments, microseismic investigation systems according to the present disclosure can include: a first sensor (which in this case is an array of sensors) 300; a second sensor 310; and a command module 90 linking the first sensor (in this case sensors) 300 and the second sensor 310.

The first sensors 300 are used to acquire data generated by acoustic signals, such as created by microseismic events 320. The first sensors 300 can be any sensor, in any configuration, suitable for detecting acoustic signals downhole, such as acoustic signals generated by microseismic events.

The second sensor 310 is used to detect an event, the timing of which event is used to trigger data transmission from the first sensors 300. In some embodiments, detecting an event means detecting a microseismic event. In some embodiments, detecting a microseismic event means detecting a property associated with the microseismic event, such as a property associated with the start of a microseismic event, such as the rapid negative pressure transients that are induced as the fractures 330 open. Accordingly, in some embodiments, the second sensor 310 can be a high frequency pressure gauge capable of detecting the rapid negative pressure transients induced as fractures open. For example, in some embodiments, the high frequency pressure gauges are capable of recording the most rapid pressure transients created by the splitting of the rock. In some embodiments, the high frequency pressure gauges are capable of making one pressure measurement every 0.25 milliseconds and recording the acquired measurement.

The microseismic investigation systems can also include a command module 90 for linking together the first sensor(s) 300 and the second sensor 310. For example, the command module 90 may include electronics which instructs the first sensor(s) 300 to begin transmitting data to surface (e.g. instructs the first sensor(s) to transmit data via a data transmission system) substantially when the second sensor 310 detects an event (for example when the second sensor 310 detects a property associated with the occurrence of a microseismic event). The data transmission system can be any appropriate system, such as copper conductors or optical fiber-based telemetry systems.

According to the configuration of FIG. 2, the first sensors 300, which are a microseismic sensor array, are deployed in a monitoring well M, where the second sensor 310, which is a high frequency pressure gauge, is located in the wellbore B itself. The command module 90, which links the first sensors 300 with the second sensor 310 is located at the surface. In other embodiments, the electronics may be located downhole or at the surface, depending on the relative configuration of the first sensors 300 and the second sensor 310. For example, when the first and second sensors are located in the same wellbore such as in the embodiment illustrated in FIG. 3, the electronics may be downhole or at the surface. However, the embodiment of FIG. 3 illustrates a surface command module 90.

Regardless of the configuration—whether according to FIG. 3, where the first and second sensors are located in the same borehole, or FIG. 2, where the first and second sensors are located in separate boreholes, in some embodiments, the systems can also include a data acquisition system (for example for storage and/or further processing of the data) at the surface, which may be part of the command module 90 or may be, for example, a separate receiver subsystem including a recorder and processor.

As can be understood from the description of the systems, in operation, when a sensor configured to detect an event is triggered, a separate sensor or array of sensors begins transmitting data, for example data associated with the event. For example, when a microseismic event occurs downhole, a high frequency pressure gauge registers a rapid negative pressure transient causing a command module to activate microseismic sensors deployed to acquire data relating to the microseismic event to transmit data.

As a person of skill understands, the transmitted data may include data acquired prior to detection of the event in order to better assure that substantially all data, which has been acquired that is associated with the event, is transmitted. Thus, for example, the microseismic sensors may be actively acquiring data for a greater time period than the time period in which they are actively transmitting data. In some embodiments, the microseismic sensors transmit data for substantially the same length of time as the microseismic event continues. In some embodiments, the microseismic sensors transmit data for an amount of time after being triggered that ranges from about a few seconds to about a few minutes, such as for example the microseismic sensors transmit data for up to about twenty seconds, up to about thirty seconds, up to about one minute, up to about two minutes, up to about three minutes, up to about four minutes, or even up to about five minutes. In some embodiments, the first sensor(s) transmits data for at least an amount of time equal to an average duration of a microseismic event. In some embodiments, the first sensor(s) transmits data for an amount of time equal to the expected duration of the longest microseismic event.

In further embodiments, regardless of the duration of transmission, the data transmitted by the first sensor(s) includes data acquired shortly before the second sensor identifies the occurrence of the event. In some embodiments, the data transmitted by the first sensor(s) includes data acquired shortly before, during and/or shortly after the second sensor identifies the occurrence of the event, for example the data transmitted includes data acquired up to about ten seconds prior to the second sensor identifying the occurrence of the event through data collected up to about ten seconds, up to about twenty seconds, or up to about one, two, three, four or even five minutes after the second sensor identifies the occurrence of the event. As a person of skill understands, the transmitted data may include data acquired prior to detection of the event in order to better assure that substantially all data, which has been acquired that is associated with the event, is transmitted.

In some embodiments, the systems and methods may provide the ability to acquire pertinent data, for example pertinent microseismic data in real-time with one or more of: an unconstrained data acquisition sampling rate, an unconstrained number of sensors in the array, and a suitable telemetry system.

While the detailed description has been made with respect to a limited number of embodiments, those skilled in the art, having the benefit of this disclosure, will appreciate numerous modifications and variations there from. It is intended that the appended claims cover such modifications and variations as fall within the true spirit and scope of this disclosure.

What is claimed is:

1. A borehole microseismic survey system, comprising:
   a. a first sensor for acquiring data associated with acoustic signals;
   b. a second sensor for detecting a property associated with a microseismic event; and
   c. a command module configured for instructing the first sensor to transmit acquired data when the second sensor detects the property.

2. A borehole system according to claim 1, wherein the property is a rapid negative pressure transient induced as a fracture opens, and the second sensor is a high frequency pressure gauge.

3. A borehole system according to claim 1, wherein the command module is configured for instructing the first sensor to transmit data for an amount of time equal to an average duration of a microseismic event.

4. A borehole system according to claim 1, wherein the command module is configured for instructing the first sensor to transmit data for an amount of time ranging from about twenty seconds to about five minutes.

5. A borehole system according to claim 1, further comprising a data acquisition system, wherein the first sensor is located in a first borehole, the second sensor is located in a second borehole different from the first borehole, the data acquisition system is located on surface, and the command module is located on surface.

6. A borehole system according to claim 1, wherein the first sensor is a sensor array.

7. A borehole system according to claim 1, wherein the second sensor is a sensor array.

8. A borehole system according to claim 1, wherein:
   the first sensor is a first sensor array; and
   the second sensor is a second sensor array.

9. A borehole system according to claim 1, wherein the first sensor transmits a portion of acquired data, which portion comprises data acquired shortly before the second sensor detects the property.

10. A borehole system according to claim 9, wherein the portion corresponds to data acquired up to about ten seconds before the second sensor detects the property.

11. A borehole system according to claim 1, further comprising a data acquisition system, wherein the first sensor and the second sensor are located in a borehole, the data acquisition system is located on surface, and the command module is located either on surface or in the borehole.

12. A borehole system according to claim 11, wherein the command module is located in the borehole.

13. A borehole microseismic survey method, comprising: using a first sensor to acquire acoustic data, activating the first sensor to transmit data relating to a microseismic event substantially when a second sensor identifies an occurrence of the microseismic event.

14. A borehole method according to claim 13, further comprising: deactivating the first sensor from transmitting data substantially when the microseismic event ends.

15. A borehole method according to claim 13, wherein the transmitted data comprises data acquired by the first sensor shortly before the second sensor identifies the occurrence.

16. A borehole method according to claim 13, further comprising:
   deploying the first sensor in a first borehole; deploying the second sensor in a second borehole;
   deploying a surface data acquisition system to which the first sensor transmits the data;
   and deploying a command module on surface when the first borehole and the second borehole are separate boreholes or deploying the command module either on surface or in the first borehole when the first borehole and the second borehole are the same borehole.

17. A borehole method according to claim 13, wherein, once activated, the first sensor transmits data for a pre-determined time period ranging from a few seconds to a few minutes.

18. A borehole method according to claim 17, wherein the pre-determined time period ranges from about twenty seconds to about five minutes.

19. A borehole method according to claim 13, wherein detecting the occurrence of the microseismic event comprises detecting a rapid negative pressure transient induced as a fracture opens.

20. A borehole method according to claim 19, wherein the second sensor is a high frequency pressure gauge and detecting comprises using the high frequency pressure gauge to detect the rapid negative pressure transient.

* * * * *